United States Patent [19]

Giesbrecht

[11] 4,299,789
[45] Nov. 10, 1981

[54] ROLLER DIE EXTRUDER AND METHOD OF USE

[75] Inventor: George G. Giesbrecht, Kitchener, Canada

[73] Assignee: Uniroyal Ltd., Ontario, Canada

[21] Appl. No.: 100,575

[22] Filed: Dec. 5, 1979

Related U.S. Application Data

[63] Continuation of Ser. No. 899,910, Apr. 26, 1978, abandoned.

[51] Int. Cl.³ ............................................. B29D 7/12
[52] U.S. Cl. .............................. 264/176 R; 264/174; 264/177 R; 425/168; 425/224; 425/374; 425/376 B; 425/447
[58] Field of Search .............. 264/176 R, 177 R, 174; 425/168, 224, 374, 376 B, 447

[56] References Cited

U.S. PATENT DOCUMENTS

| 1,844,972 | 2/1932 | Parkhurst . | |
| 2,842,796 | 7/1958 | Rhodes . | |
| 2,892,212 | 6/1959 | Rhodes | 425/374 |
| 3,142,091 | 7/1964 | Curtiss . | |
| 3,869,240 | 3/1975 | Mackie et al. | 425/374 |
| 3,869,304 | 3/1975 | Bogulslawski et al. | 264/174 |
| 3,871,810 | 3/1975 | Geyer | 425/374 |
| 3,909,079 | 9/1975 | Lauterbach | 425/168 |
| 3,956,056 | 5/1976 | Bogulslawski | 425/224 |

OTHER PUBLICATIONS

"Uniroyal Unveils One-Roll Roller Die for Extrudates", *Rubber and Plastics News,* Mar. 6, 1978, p. 7.

Primary Examiner—James B. Lowe
Attorney, Agent, or Firm—Charles A. Blank

[57] ABSTRACT

In extrusion apparatus of the type having a generally cylindrical roller, a stationary die head surface confronting the roller and defining therewith an extrudate chamber, and means for rotating the roller to force material through the chamber to an extrudate shaping orifice defined by the roller and a downstream portion of the die head, a bearing pad is interposed between the roller and the die head. The roller is biased against the bearing pad so that the pad serves to space the roller from the die head to accurately control clearance between the die head and roller at the extrudate shaping orifice.

5 Claims, 7 Drawing Figures

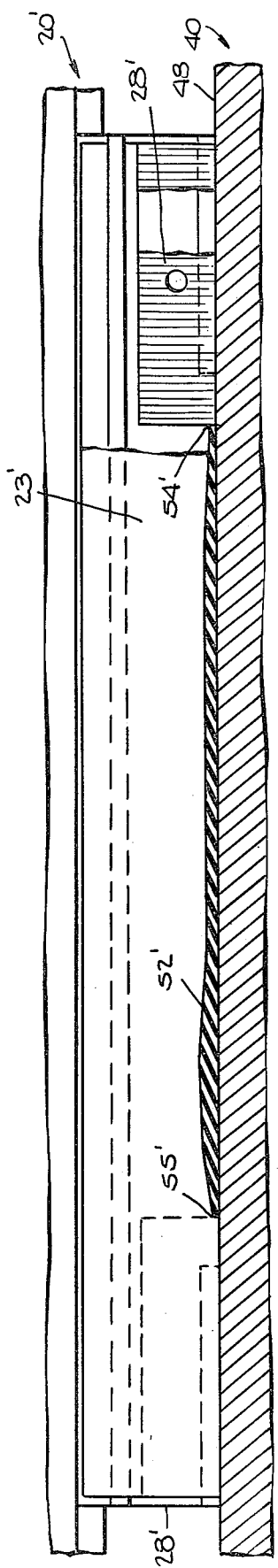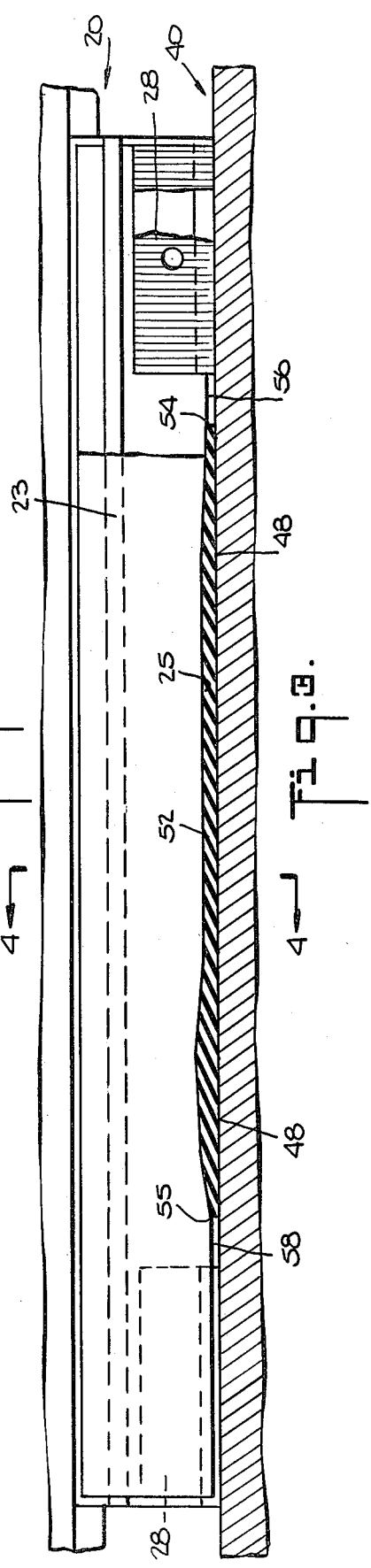

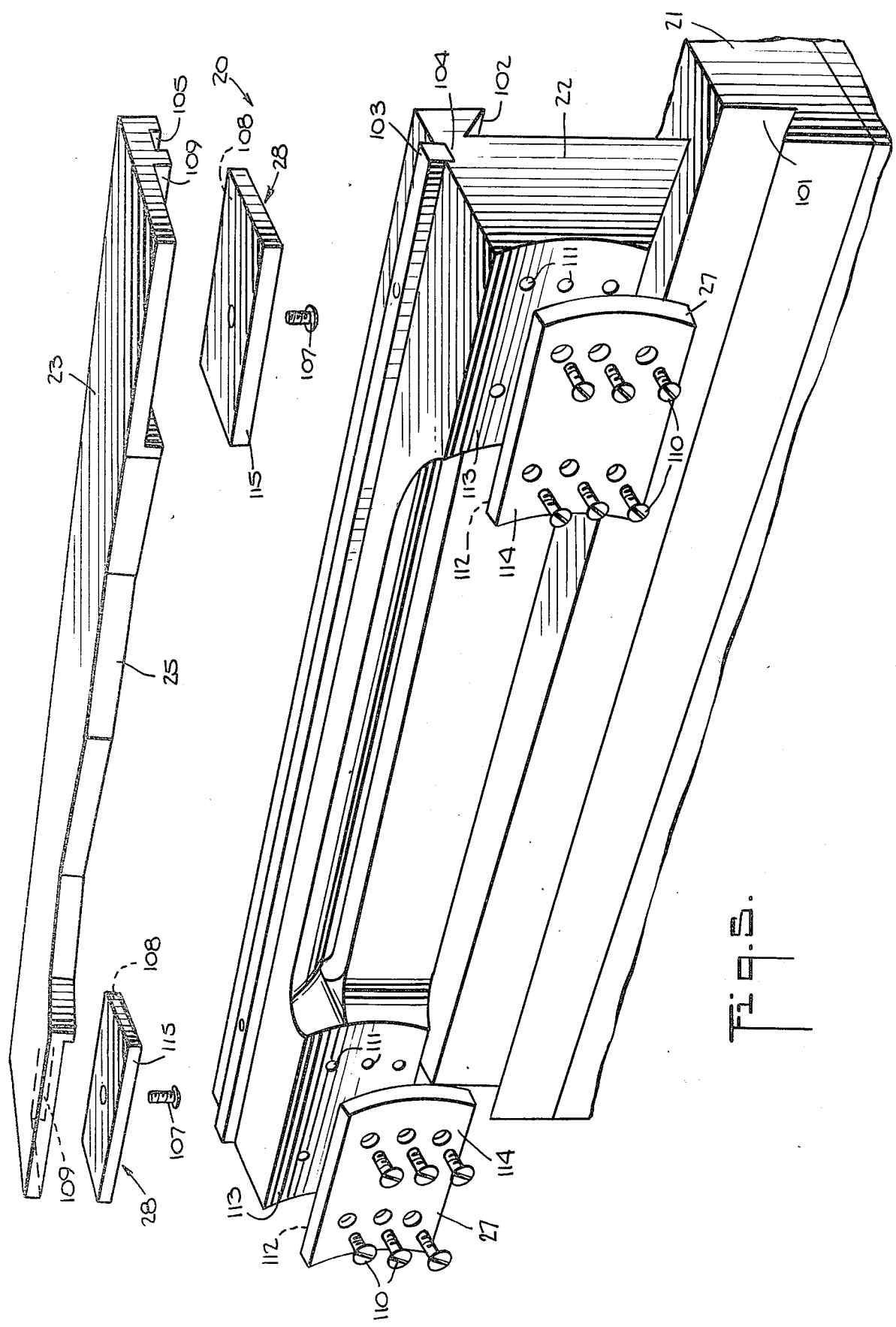

ROLLER DIE EXTRUDER AND METHOD OF USE

This is a continuation of application Ser. No. 899,910 filed Apr. 26, 1978 now abandoned.

BACKGROUND OF THE INVENTION

This invention relates to the art of extrusion machinery and more particularly to the type of extrusion machinery known as a single roller die extruder.

Extruders are normally used for the production of continuous strips having substantially constant cross-section. The material to be formed or "extrudate" is fed into the extruder, brought to a fluid or semi-fluid condition by heat, mechanical agitation or a combination of heat and mechanical agitation and forced out through an orifice having a shape generally corresponding to the cross-section desired in the finished strip.

For example, in the tire industry, an extruder is used to produce tire sidewall strips; raw rubber is fed into the extruder, fluidized by mechanical action and heat in the extruder and forced out through the orifice. Single roller die extruders are particularly suited to the production of tire sidewall strips because of their ability to produce a strip having thin edges without introducing defects or blemishes into the strip.

Single roller die extruders include a generally cylindrical roller and a stationary die head. The die head has a surface which confronts an arcuate portion of the cylindrical surface of the roller and cooperates with the roller to define an extrudate chamber. Means are provided for introducing an extrudate into this extrudate chamber. The roller is rotated about its axis to force the extrudate in a downstream direction towards a extrudate shaping orifice defined by a downstream portion of the confronting surface of the die head and the surface of the roller itself.

The direction downstream, as used in this disclosure, should be understood to mean the direction towards which the surface of the roller moves in its rotation, while the term upstream should be understood to mean the opposite direction. The terms axial and axially will also be used in this disclosure and should be understood as referring to the axis of rotation of the roller.

As can be appreciated, the thickness of the strip issuing from a single roller die extruder is controlled, at least in part, by the clearance between the stationary die head and the roller at the extrudate shaping orifice.

In the single roller die extruders of the prior art, such as those set forth in U.S. Pat. Nos. 3,871,810 and 3,869,304, the roller is positioned by the frame of the apparatus in proximity to the stationary die head so that the clearance between the surface of the die head which forms part of extrudate shaping orifice and the roller will yield the desired strip thickness and shape.

Although such apparatus is capable of producing satisfactory strips, it is difficult to accurately control the thickness of the finished strip produced by such apparatus. The material in the extrudate chamber between the roller and the die head is under substantial pressure. Although the exact pressure in the chamber is unknown, it is believed to be about 250 pounds per square inch at the point immediately upstream from the orifice. In an extruder of typical size, this extrudate pressure acting on the roller and die head creates a force on the order of 3000 pounds tending to deflect the apparatus frame and move the roller away from the die head. This movement of the roller makes it difficult to accurately maintain the clearance between the roller and the die head, and therefore makes it difficult to control the thickness of the finished strip issuing from the extruder.

SUMMARY OF THE INVENTION

Accordingly, it is a principal object of the present invention to obviate this problem of the prior are single roller die extrusion apparatus. This object is accomplished by interposing a bearing pad between the confronting surfaces of the roller and the die head. The roller is biased toward the die head so that it bears on the pad, and the pad spaces the roller from the die head.

In a preferred embodiment, two sets of bearing pads are interposed between the roller and die head and affixed to the die head so that the bearing pads form the axially spaced lateral boundaries of the extrudate chamber. In a further preferred embodiment, the bearing pads also form the axially spaced lateral boundaries of the extrudate shaping orifice so that the lateral edges of the strip are formed by contact of the extrudate with the bearing pads.

BRIEF DESCRIPTION OF THE DRAWINGS

FIG. 3 is a fragmentary, sectional view of the apparatus shown in FIGS. 1 and 2, taken along line 3—3 in FIG. 2;

FIG. 5 is an exploded view showing a portion of the die head of the apparatus shown in FIGS. 1–4;

FIG. 6 is a fragmentary sectional view of a portion of the apparatus shown in FIGS. 1–5, taken along line 6—6 in FIG. 2.

FIG. 7 is a fragmentary, sectional view similar to FIG. 3 but showing an alternate embodiment of the present invention.

DETAILED DESCRIPTION OF THE INVENTION

Figure 1:
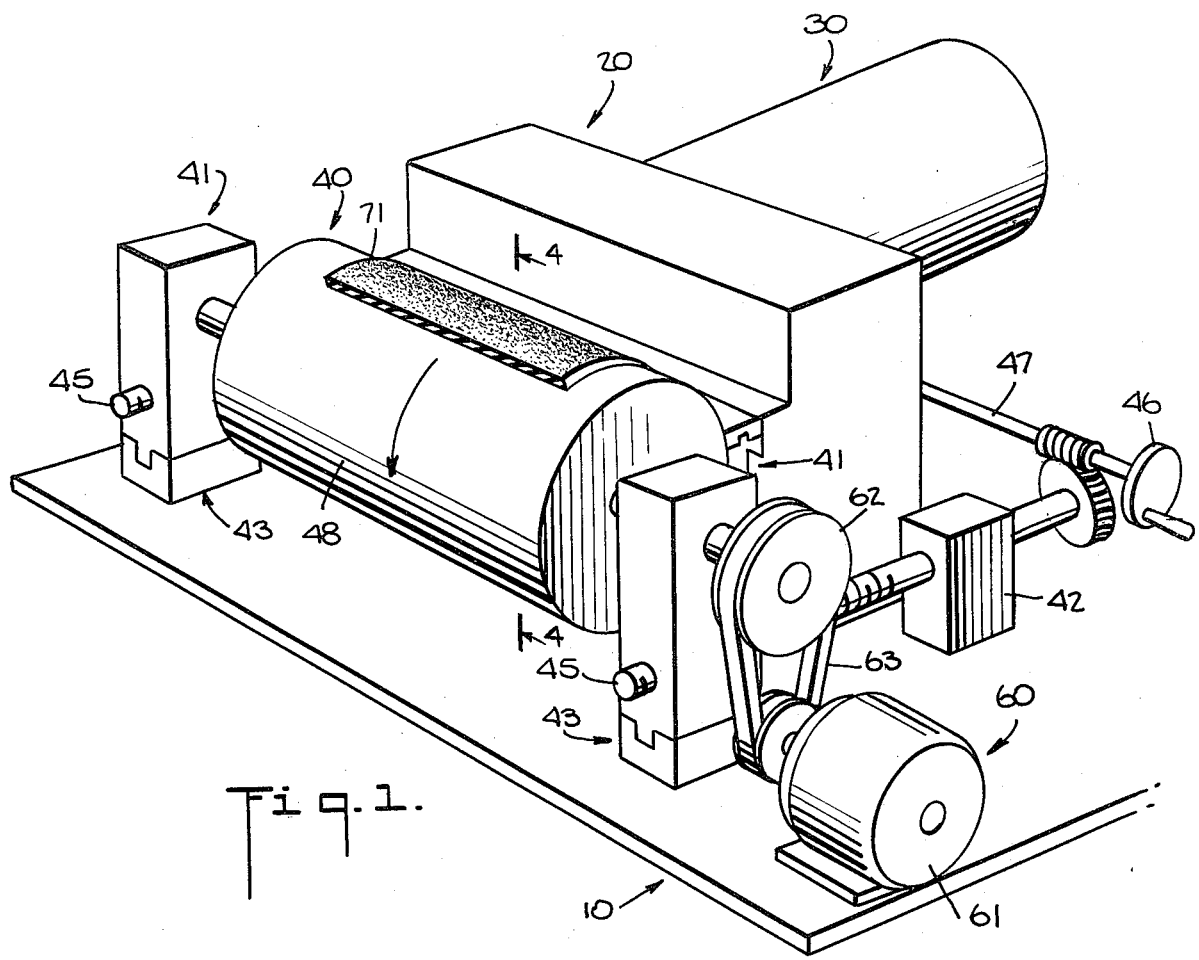
FIG. 1 is a schematic perspective view of an extrusion apparatus in accordance with one embodiment of the present invention.
Figure 8:
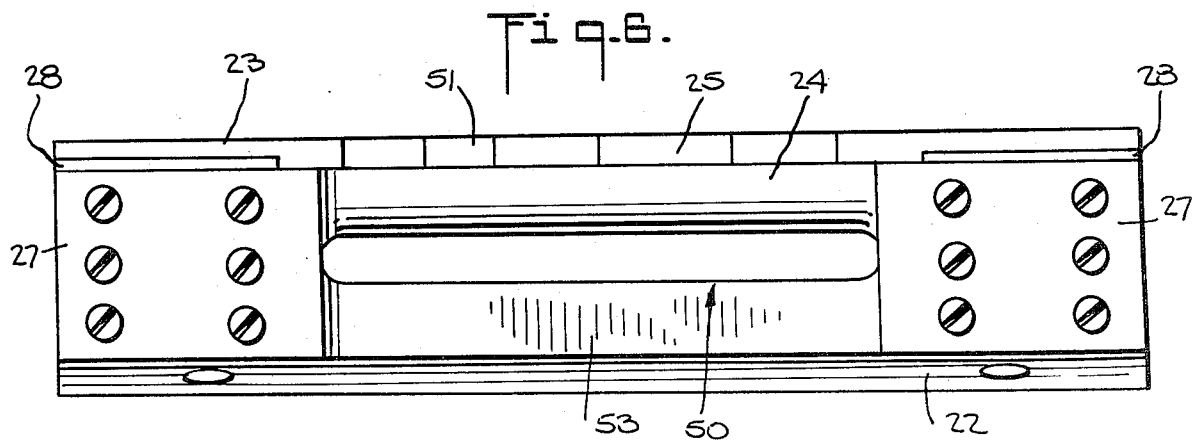

In the drawings, in which like reference numerals are used to denote like features in the different views, an extrusion apparatus according to a preferred embodiment of the present invention is shown in FIGS. 1 through 6.

The major components of the apparatus, as shown in FIG. 1, include a frame 10, a die head 20 affixed to the frame and extrudate supply means 30. A roller 40 is rotatably mounted on bearing blocks 41 which are slidably mounted to frame 10 by means of ways 43.

Roller 40 is rotatable about its axis in the direction indicated by the arrow in FIG. 1 by a drive means indicated generally at 60. Preferably drive means 60 includes a variable speed D. C. motor 61, planetary speed reducer 62, and a belt drive 63 linking the drive motor to the speed reducer.

A means for biasing roller 40 towards die head 20 is provided in the form of a pair of jackscrews 45 threadedly engaging bearing blocks 41 and rotatably mounted to brackets 42, of which only one is visible in FIG. 1. Brackets 42 are affixed to frame 10. Therefore, rotation of the jackscrews 45 will force bearing blocks 41, and hence roller 40, towards die head 20.

A handwheel 46 is linked to a shaft 47 which is arranged so that it may be linked to either one of the jackscrews 45 or to both of them at once through worm gear sets associated with the jackscrews. Thus, each jackscrew may be rotated independently to align the axis of the roller 40 with the die head 20, and then both jackscrews may be rotated simultaneously to force both ends of the roller evenly against the die head.

Figure 4:
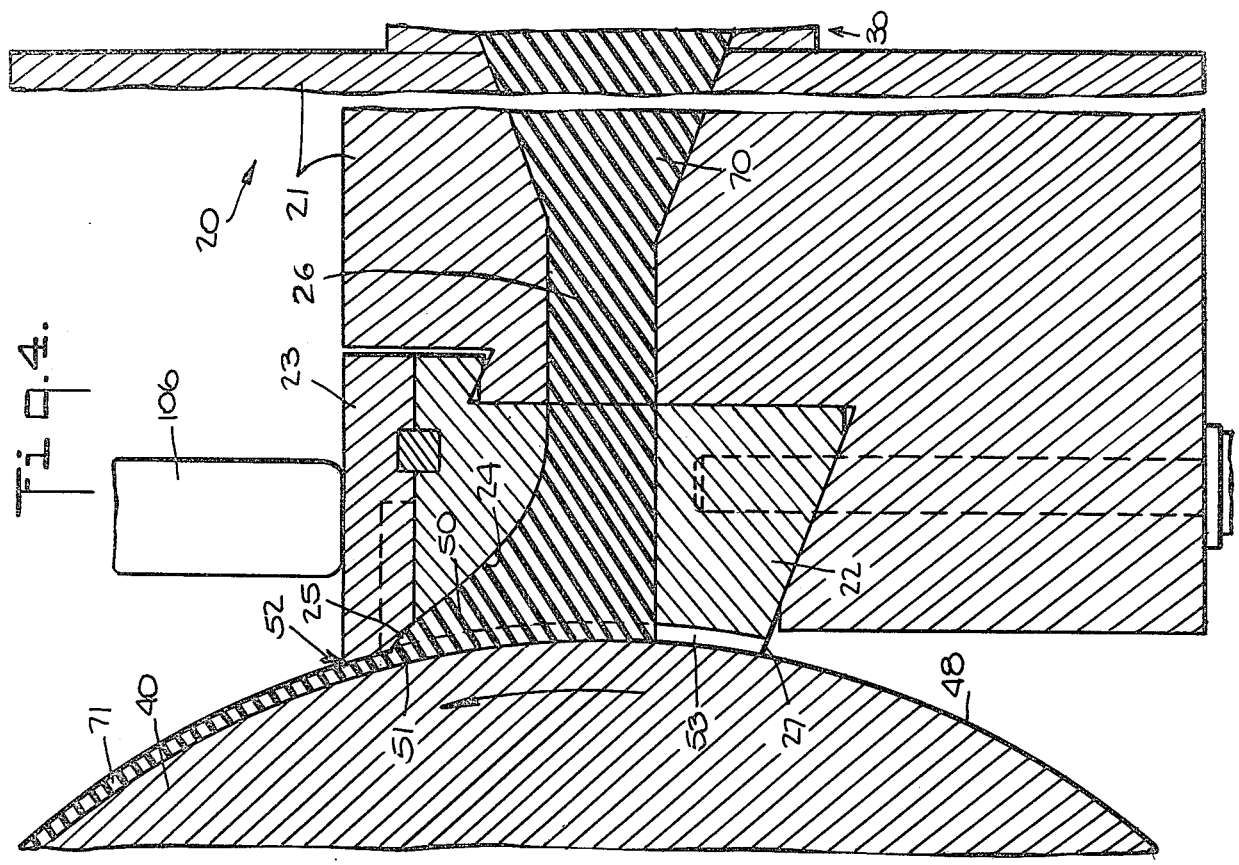
FIG. 4 is a fragmentary, sectional view of the apparatus shown in FIGS. 1–3, taken along line 4—4 in FIG. 1.

As shown in FIG. 4, the roller 40 and die head 20 cooperatively define an extrudate chamber 50 between their confronting surfaces. Extrudate supply means 30 forces the extrudate 70, in a fluid condition, into the chamber 50 through a passageway 26 in die head 20. The rotation of roller 40 forces the extrudate 70 through the chamber and out through an orifice at the downstream end of the chamber where it is shaped into a continuous strip 71. The structure of the chamber and orifice will be described below. The strip 71 is carried downstream, away from die head 20, by the continued rotation of roller 40, and is then removed from the roller by conventional means, not shown.

The term "fluid" has been used to describe the condition of the extrudate in the chamber. This term should be understood to include any flowable condition. For example, an extrudate composed of rubber stock may be in a gummy condition and have physical properties akin to wet chewing gum; the rubber stock in such a condition would be in a "fluid" condition. Of course, depending on the nature of the extrudate, the extrudate may have to be heated or cooled so that it will cure to a solid or semi-solid condition by the time it is removed from the roller. This may be accomplished by heating or cooling the roller 40 and the die head 20 by conventional means well known to those skilled in the art.

As seen in sectional view in FIG. 4, die head 20 includes a base element 21, an upstream element 22 and a downstream element 23. These elements are shown in exploded view in FIG. 5. A surface 24 of upstream element 22 confronts roller 40 and cooperates with the arcuate surface 48 of roller 40 to define an upstream portion of the extrudate chamber 50. A surface 25 of downstream element 23 confronts roller 40 and cooperates with the arcuate surface 48 of roller 40 to define a downstream portion 51 of the extrudate chamber.

The extrudate 70 enters the chamber 50 from extrudate supply means 30 through a channel 26 in base element 21 of die head 20. This channel 26 extends into upstream element 22 and communicates with the extrudate chamber 50.

As shown in FIG. 3, the confronting surface 25 of downstream element 23 cooperates with the surface 48 of roller 40 to define an extrudate shaping orifice 52 at downstream end of the downstream portion 51 (FIG. 4) of the extrudate chamber. As the extrudate 70 moves through the extrudate chamber and the orifice 52, it is shaped to a cross-section substantially corresponding to the shape of the orifice. The roller-confronting surface 25 of downstream element 23 of die head 20 is shaped so that it will define an orifice 52 of the desired shape in cooperation with the surface 48 of the roller.

As shown in FIG. 4, the roller confronting surfaces 24 and 25 of die head elements 22 and 23 preferably are also shaped so that they converge with the surface 48 of roller 40 in the downstream direction. This convergence helps to pressurize the extrudate as it is forced downstream by roller 40 towards the orifice 52. A sufficient extrudate pressure at the orifice is desirable because it helps to prevent voids in the finished product.

There is a gap 53 between the upstream die head element 22 and the surface 48 of roller 40 upstream of the extrudate chamber 50. Because the rotation of roller 40 forces the extrudate downstream, away from the gap, the extrudate does not flow out through this gap.

Figure 2:
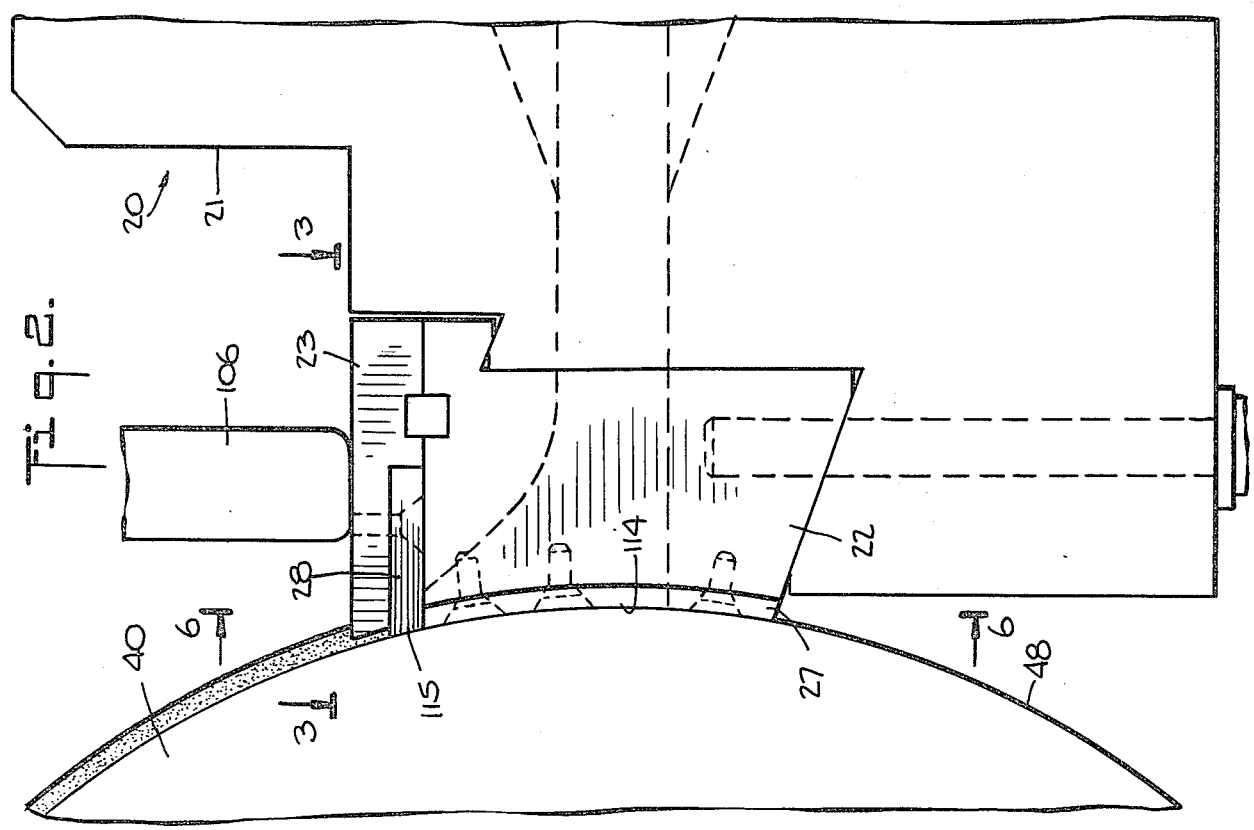
FIG. 2 is a fragmentary, elevational view of the apparatus shown in FIG. 1.

As shown in FIG. 2, bearing pads 27 and 28 are interposed between the roller 40 and the die head 20. In particular, upstream bearing pads 27 are affixed to the upstream element 22 of die head 20, while downstream bearing pads 28 are affixed to the downstream element 23 of die head 20.

As shown in FIGS. 5 and 6, two downstream bearing pads 28 and two upstream bearing pads 28 and two upstream bearing pads 27 are provided, forming two sets of bearing pads. The sets of bearing pads are axially spaced apart, one on each side of the extrudate chamber 50 and 51 (FIG. 6).

The roller 40 is forced against the bearing pads 27 and 28 (FIG. 2) by jackscrews 45 (FIG. 1). The force exerted by the biasing means or jackscrews 45 on the roller 40 to bias it against bearing pads 27 and 28 is at least equal to the force exerted by the extrudate pressure in the chamber which tends to force roller 40 away from the die head 20 and thus away from bearing pads 27 and 28.

Therefore, roller 40 will always bear against bearing pads 27 and 28 throughout the operation of the apparatus despite the presence of extrudate pressure in the chamber. As the roller, the bearing pads and the die head are quite rigid, the bearing pads will accurately position the roller 40 with respect to the die head, and will accurately maintain the clearance between the surface 48 of the roller and the surface 25 of element 23 of the die head 70 which forms part of the extrudate shaping orifice 52 (FIG. 3). Thus, the size of the extrudate shaping orifice 52 will be accurately maintained during operation of the apparatus and the thickness of the strip issuing from the apparatus can also be accurately maintained.

The placement of the bearing pads shown in FIGS. 1 through 6, axially spaced apart with bearing pads on both sides of the extrudate chamber, prevents misalignment of the roller with the die head which might be caused by unbalanced loading of the roller if the pads were placed on only one side of the extrudate chamber.

The particular placement of the bearing pads in the embodiment of FIGS. 1 through 6 also allows the use of the bearing pads in axially confining the extrudate within the extrudate chamber, in addition to their use in spacing the roller from the die head.

As seen in FIG. 6, the upstream bearing pads 27 affixed to upstream element 22 of die head 20 lie immediately axially outboard of the upstream portion 50 of the extrudate chamber. Because the roller surface 48 of roller 40 bears on pads 27 during operation of the apparatus (FIG. 2), there is no clearance between the pads and the roller during operation of the apparatus. Therefore, the extrudate cannot leak axially outwardly from the upstream portion of the extrudate chamber.

As set forth above, the extrudate is formed into the finished strip at the extrudate shaping orifice 52 which is defined by the surface 25 of the downstream die head element 23 and the surface 48 of roller 40 (FIG. 3). The lateral edges of the finished strip are formed at the axially spaced lateral boundaries 54 and 55 of this orifice. In the embodiment shown in FIGS. 1 through 6, the downstream bearing pads 28 are positioned axially outboard of the boundaries 54 and 55 and remote from these boundaries. Because the downstream element 23 of die head 20 is spaced from the surface 48 of roller 40 over its entire axial extent, there are additional gaps 56 and 58 lying between the lateral boundaries 54 and 55 of the extrudate shaping orifice 52 and the downstream bearing pads 28. Some extrudate will flow out from the extrudate chamber through these gaps 56 and 58 and form a trim on the lateral edges of the finished strip. This trim is removed from the strip in a subsequent operation.

To control the amount of flash or trim on the finished strip, the configuration of the downstream bearing pads 28 and the downstream element 23 of die head 20 are chosen such that the gaps 56 and 58 have a thickness which is so small that the amount of material passing through the gaps is negligible. For example, in the extrusion of tire sidewall slabs, the gaps 56 and 58 are preferably no thicker than about 0.030 inches.

As set forth above, roller 40 bears against the bearing pads 27 and 28 (FIG. 2) with substantial force. Because the bearing pads 27 and 28 are fixed to the stationary die head 20, the surface 48 of roller 40 must slide over the contacting surfaces 114 and 115 of pads 27 and 28 as roller 40 rotates. Therefore, the materials from which pads 27 and 28 are fabricated must be chosen to form a low friction bearing with the surface 48 of roller 40. This bearing must operate without galling or excessive wear even under the substantial contact pressures between the roller surface 48 and the pad surfaces 114 and 115 which are encountered in operation of the apparatus.

To prevent galling, the bearing pads 27 and 28 should be fabricated from a material with a hardness which differs from that of the roller. Since the bearing pads can be readily replaced as described below, it is preferable to fabricate the bearing pads from material which is softer than the material of the roller surface 48 so that the surfaces 114 and 115 of pads 27 and 28 will wear and the roller surface 48 will be preserved.

The bearing formed by the roller and the pads should preferably be capable of operation without any external lubrication. If external lubricants such as oil were applied to either the roller surface or the bearing pads, they might contaminate the extrudate stream and thus contaminate the finished strip.

The bearing must also be capable of operation at the die head temperature employed in operation of the apparatus. Of course, the required die head temperature will vary with the material to be extruded and thus the heat resistance requirements for the bearing pads will also vary with the material to be extruded.

For use in the extrusion of natural rubber, the preferred material for the bearing pads is a composition of nylon 6/6 and molybdenum disulfide sold under the registered trademark Nylatron GS by the Polymer Corporation, Reading, PA. Another suitable pad material is a filled polytetrafluoroethylene composition sold under the registered trademark Turcite by the W. S. Shamban Co., Los Angeles, CA.

The roller 40 is preferably fabricated from a hard, metallic material such as steel or iron. The preferred structure and assembly of die head 20 is shown in exploded view in FIG. 5. Die head base element 21 is provided with a generally V-shaped notch 101. Upstream element 22 is provided with a mating, generally V-shaped tongue 102 which seats in notch 101. A conventional key 103 is seated in an axially extending keyway 104 in the downstream surface of upstream element 22. A similar axially extending keyway 105 is provided in the upstream surface of downstream element 23 to engage the projecting portion of key 103 and align the downstream element 23 with the upstream element 22.

In the operating condition of the die head, the downstream element 24 is forced against upstream element 22 by a force applying means such as a fluid cylinder (not shown) acting through a push rod 106 (FIG. 4). Thus, upstream element 22 is also forced against base element 21 so that elements 23, 22 and 21 are locked firmly together.

The downstream bearing pads 28 are affixed to the downstream confronting element 23 by screws 107, which engage threaded holes (not shown) in downstream element 23. Of course, to allow downstream element 23 to seat closely against upstream element 22, the heads of screws of 107 are countersunk into the bearing pads 28.

The surfaces 108 of bearing pads 28 which will face away from the roller 40 in the operating condition of the assembly are arranged to seat against corresponding supporting surfaces 109 of downstream element 23.

The upstream bearing pads 27 are fastened to upstream element 22 by screws 110 engaging threaded holes 111 in element 22. The back surface 112 of each of the bearing pads 27 seats on the corresponding surface 113 of element 22. The screws 110 help restrain the pads 27 on surface 113 against the wiping or frictional forces generated by the roller during operation of the apparatus. To prevent damage to the roller, the heads of screws of 110 are countersunk into pads 27.

To assure an accurate fit of the pads 27 against the arcuate surface 48 of roller 40 (FIG. 2) the surfaces 114 of pads 27 which contact the roller surface are contoured to a radius matching that of roller surface 48. Because, in the embodiment shown, the arcuate extent of contact between the pads 28 and the roller 40 is fairly small, the surfaces 115 of pads 28 which contact roller surface 48 may be fabricated as flat surfaces. Over the small arcuate extent of the mutual contact between surfaces 115 and 48, the deviation between the straight surfaces 115 and the curved surface 48 of roller 40 is negligible.

The construction of the die head as described above allows the apparatus to be readily dismantled for maintenance. When the force applied by push rod 106 (FIG. 2) is relieved and the roller 40 is moved away from the die head by the jackscrews 45 (FIG. 1), die elements 22 and 23 may be readily removed from base element 21. Once the die elements 22 and 23 have been removed from the apparatus, bearing pads 27 and 28 may be readily exchanged for new ones.

If it is desired to change the shape of the finished strip, downstream element 23 may be exchanged for a different downstream element, and the apparatus may be reassembled. Of course, the finished strip issuing from the apparatus after the reassembly will reflect the shape of the new downstream element. If major changes are to be made in the shape of the finished strip, it may also be desirable to replace upstream element 22 to preserve the desired flow pattern at the transition between the two confronting elements 22 and 23.

As described above, the strips formed by the apparatus shown in FIGS. 1 through 6 will normally have some trim along their lateral edges, which must be removed from the strip after forming. An apparatus according to an alternate embodiment, partially depicted in FIG. 7, will form strips without this trim on the edges. The apparatus of this alternate embodiment is identical to the apparatus shown in FIG. 1-6 except for the configuration of the downstream die element and the bearing pads associated therewith.

In the apparatus of this embodiment, as shown in FIG. 7, the downstream bearing pads 28' are affixed to the downstream die element 23' and are axially spaced apart from one another. However, bearing pads 28 extend axially inwardly so that they define the axially spaced lateral boundaries 54' and 55' of the extrudate shaping orifice 52'. Because the surface 48 of roller 40 bears against the pads 28', no extrudate can pass between the pads 28' and the roller surface 48. Thus, the lateral edges of the strip issuing from the orifice will be formed without trim by contact of the extrudate with the bearing pads 28' at the boundaries 54' and 55' of orifice 52'.

As will be readily appreciated, many variations and combinations of the features set forth above can be utilized.

By way of example only, the bearing pads need not be affixed to the die head. Rather, they may be formed as hoops of bearing material affixed to the roller at axially spaced locations. Although the sliding contact will then be between the hoops of bearing material (the bearing pads) and the die head rather than between the pads and the roller surface, the location of the roller with respect to the die head will still be maintained if the roller bears upon the die head through the pads or hoops.

Alternatively, and also by way of example only, the bearing pads may be formed integrally with the die head if the die head material is selected by use of the criteria set forth above for the bearing pad material. Thus, the entire die head may be fabricated from molybdenum disulfide filled nylon 6/6.

Of course, a reinforcing fabric may be incorporated in the finished strip produced by the apparatus by feeding the fabric into the extrudate chamber of the apparatus through the upstream gap 53 (FIG. 4) during operation of the apparatus.

Therefore, the scope of the present invention should be understood to include all of the numerous variations and combinations of features which can be employed without departing from the spirit of the invention as set forth in the appended claims.

I claim:

1. In an extrusion apparatus of the type having :
   (a) a generally cylindrical roller;
   (b) a stationary die head having a surface confronting said roller over a portion of the arcuate surface thereof to define a chamber between said die head and said roller;
   (c) means for supplying an extrudate in a fluid condition to said chamber; and
   (d) means for rotating said roller about its axis to force said extrudate in a downstream direction through said chamber so that at least the extrudate in a downstream portion of said chamber is under pressure, a downstream portion of said confronting surface of said die head cooperating with said surface of said roller to define an extrudate shaping orifice at the downstream end of said chamber, the improvement comprising:
   (e) at least two bearing pads interposed between said roller and said die head and affixed to said die head, said pads being spaced axially from one another and said pads forming the axially spaced lateral boundaries of at least a portion of said chamber; and
   (f) means for biasing said roller towards said die head with a force at least equal to the force exerted on said roller by the pressurized extrudate in said chamber so that said roller will bear on said die head through said bearing pads during its rotation and said pads will space said roller from said die head whereby said bearing pads will be maintained in sliding contact with a surface of said roller, the materials of said bearing pads and of the last-mentioned surface being selected so that said bearing pads and said last-mentioned surface differ from one another in hardness and form a bearing operable without galling at the die head temperature to be employed in operation of the apparatus.

2. The improvement as claimed in claim 1 wherein said pads define the axially spaced lateral boundaries of said extrudate shaping orifice.

3. In an extrusion apparatus of the type having;
   (a) a generally cylindrical roller;
   (b) a stationary die head having a surface confronting said roller over a portion of the arcuate surface thereof to define a chamber between said die head and said roller;
   (c) means for supplying an extrudate in a fluid condition to said chamber; and
   (d) means for rotating said roller about its axis to force said extrudate in a downstream direction through said chamber so that at least the extrudate in a downstream portion of said chamber is under pressure, a downstream portion of said confronting surface of said die head cooperating with said surface of said roller to define an extrudate shaping orifice at the downstream end of said chamber, the improvement comprising:
   (e) at least two bearing pads interposed between said roller and said die head and affixed to said die head, said pads being spaced axially from one another,
   (f) a frame included in said apparatus and
   (g) a bearing block slidably mounted to said frame,
   (h) said die head including a base element mounted to said frame, an upstream element releasably mounted to said base element and a downstream element releasably mounted to said upstream element, an upstream portion of said chamber being defined by a surface of said upstream element confronting said roller and said extrudate shaping orifice being defined by a surface of said downstream element confronting said roller, said roller being rotatably mounted to said bearing block,
   (i) two upstream bearing pads affixed to said upstream element and two downstream bearing pads affixed to said downstream element so that said upstream and downstream bearing pads constitute two sets of bearing pads spaced axially from each other and lying axially outboard of said chamber on both sides thereof, said downstream bearing pads defining the axially spaced lateral boundaries of said extrudate shaping orifice, and
   (j) means for biasing said roller against said bearing pads including means for biasing said bearing block towards said die head with a force at least equal to the force exerted on said roller by the pressurized extrudate in said chamber so that said roller will bear on said die head through said bearing pads during its rotation and said pads will space said roller from said die head whereby said bearing pads will be maintained in sliding contact with a surface of said roller, the materials of said bearing pads and of the last-mentioned surface being selected so that said bearing pads and said last-mentioned surface differ from one another in hardness and form a bearing operable without galling at the die head temperature to be employed in operation of the apparatus.

4. In a method of extruding a strip of extrudate including the steps of;
  (a) feeding the extrudate in a fluid condition into a chamber defined by the arcuate surface of a generally cylindrical roller and a confronting surface of a die head, and
  (b) rotating the roller about its axis to carry the extrudate in a downstream direction through the camber, pressurize the extrudate in a downstream portion of the chamber and force the extrudate through an extrudate shaping orifice defined by the roller and a portion of the confronting surface of the die head at the downstream end of the chamber, the improvement comprising:
  (c) during rotation of the roller, biasing the roller, with a force at least equal to the force exerted on the roller by the pressurized extrudate in the chamber, against two bearing pads which are interposed between the roller and the die head axially spaced from one another defining axially spaced lateral boundaries of at least a selected portion of the chamber and which are affixed to said die head or said roller, so that the roller bears on the die head through the pads and the pads serve to space the roller from the die head, whereby the pads will be in sliding contact with a surface of said roller or of said die head, the materials of the pads and of the last-mentioned surface being selected so that the pads and said last-mentioned surface differ from one another in hardness and form a bearing operable without galling at the die head temperature employed, furhter comprising the step of
  (d) axially confining the extrudate in said selected portion of the chamber by means of the bearing pads.

5. In a method of extruding a strip of extrudate including the steps of:
  (a) feeding the extrudate in a fluid condition into a chamber defined by the arcuate surface of a generally cylindrical roller and a confronting surface of a die head, and
  (b) rotating the roller about its axis to carry the extrudate in a downstream direction through the chamber, pressurize the extrudate in a downstream portion of the chamber and force the extrudate through an extrudate shaping orifice defined by the roller and a portion of the confronting surface of the die head at the downstream end of the chamber, the improvement comprising:
  (c) during rotation of the roller, biasing the roller, with a force at least equal to the force exerted on the roller by the pressurized extrudate in the cahmber, against two bearing pads which are interposed between said roller and the downstream portion of said die head and spaced axially from one another so that the bearing pads define the axially spaced lateral boundaries of said extrudate shaping orifice and which are affixed to said die head or said roller, so that the roller bears on the die head through the pads and the pads serve to space the roller from the die head, whereby the pads will be in sliding contact with a surface of said roller or of said die head, the materials of the pads and of the last-mentioned surface being selected so that the pads and said last-mentioned surface differ from one another in hardness and form a bearing operable without galling at the die head temperature employed further comprising the step of
  (d) forming the lateral boundaries of the strip by contact between the extrudate and the pads at the extrudate shaping orifice.

* * * * *